(12) United States Patent
De Vries et al.

(10) Patent No.: US 7,362,688 B2
(45) Date of Patent: Apr. 22, 2008

(54) OPTICAL SCANNING DEVICE

(75) Inventors: Jorrit Ernst De Vries, Eindhoven (NL); Bernardus Hendrikus Wilhelmus Hendriks, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 150 days.

(21) Appl. No.: 10/490,362

(22) PCT Filed: Sep. 19, 2002

(86) PCT No.: PCT/IB02/03905

§ 371 (c)(1),
(2), (4) Date: Mar. 22, 2004

(87) PCT Pub. No.: WO03/025921

PCT Pub. Date: Mar. 27, 2003

(65) Prior Publication Data

US 2006/0164950 A1      Jul. 27, 2006

(30) Foreign Application Priority Data

Sep. 20, 2001   (EP) .................................. 01203572

(51) Int. Cl.
*G11B 7/00* (2006.01)

(52) U.S. Cl. ............................ 369/112.01; 369/112.02

(58) Field of Classification Search ............. 369/112.1, 369/112.01, 112.02, 44.23, 44.24, 103
See application file for complete search history.

(56) References Cited

U.S. PATENT DOCUMENTS 6,084,843 A    7/2000  Abe et al.
7,012,876 B2 *  3/2006  Hendriks et al. ....... 369/112.24

FOREIGN PATENT DOCUMENTS

EP    0 881 634    12/1998
EP    1 109 164    6/2001
WO    WO99 57720   11/1999

* cited by examiner

*Primary Examiner*—Nabil Hindi
(74) *Attorney, Agent, or Firm*—Michael E. Belk

(57) ABSTRACT

An optical scanning device for scanning first and second type of record carriers includes a radiation-generating device for generating a radiation beam having first and second wavelengths in the different modes. An objective system focuses the radiation beam on the record carrier. An optical element is provided having a structure in the radiation beam for introducing vergence and aberration in the radiation beam of the second wavelength. The aberration may be written as a polynomial with at least two terms $a_2\rho^2$ and $a_4\rho^4$. If $a_2=0$ and $a_4=0$, the corresponding values of $a_4$ and $a_2$ are given by $a_{40}$ and $a_{20}$, respectively. $a_2$, $a_4$, $a_{20}$ and $a_{40}$ satisfy the relation $0.9<((a_2/a_{20})+(a_4/a_{40}))<1.1$, as well as either the relation $0.20<(a_2/a_{20})<0.90$ (if $a_{40}$) or the relation $1.05<(a_2/a_{20})<2.00$ (if $a_4<0$).

4 Claims, 7 Drawing Sheets

| | f (mm) | Δ (mm) | γ (°) | $\alpha_2$ (rad) | $\alpha_4$ (rad) | $\alpha_2/\alpha_{20}$ (-) | $\alpha_4/\alpha_{40}$ (-) | $\alpha_2/\alpha_{20} +$ $\alpha_4/\alpha_{40}$ (-) | coma (Δ) (mλ RMS) | coma (γ) (mλ RMS) |
|---|---|---|---|---|---|---|---|---|---|---|
| 1 | 2.75 | 0.05 | 0.5 | 110.8 | -12.0 | 0.50 | 0.60 | 1.10 | 39 | 29 |
| 2 | 2.75 | 0.10 | 0.5 | 195.3 | -2.93 | 0.89 | 0.15 | 1.04 | 40 | 48 |
| 3 | 1.80 | 0.05 | 0.5 | 101.4 | -7.37 | 0.70 | 0.38 | 1.08 | 46 | 44 |
| 4 | 2.75 | 0.2 | 0.5 | 235.2 | 2.08 | 1.07 | -0.10 | 0.97 | 50 | 59 |

FIG. 5

| | f | Δ | γ | $\alpha_2$ | $\alpha_4$ | $\alpha_2/\alpha_{20}$ | $\alpha_4/\alpha_{40}$ | $\alpha_2/\alpha_{20}$ + $\alpha_4/\alpha_{40}$ | coma (Δ) | coma (γ) |
|---|---|---|---|---|---|---|---|---|---|---|
| | (mm) | (mm) | (°) | (rad) | (rad) | (-) | (-) | (-) | (mλ RMS) | (mλ RMS) |
| a | 2.75 | 0.07 | 0.3 | 215.8 | -0.37 | 0.98 | 0.02 | 1.00 | 21 | 32 |
| b | 2.75 | 0.13 | 0.7 | 217.0 | -0.26 | 0.99 | 0.01 | 1.00 | 39 | 75 |

FIG. 6

OPTICAL SCANNING DEVICE

The invention relates to an optical scanning device for scanning a first and a second type of record carrier in a first and a second mode, respectively, the device comprising a radiation-generating device for generating a radiation beam having at least a first wavelength in the first mode and at least a second wavelength in the second mode, an objective system for forming the radiation beam of the first wavelength to a focus in the first mode on the first type of record carrier and for forming the radiation beam of the second wavelength to a focus in the second mode on the second type of record carrier, and a structured optical element arranged separately with respect to elements of the objective system in the radiation beam for introducing aberration in the radiation beam of the second wavelength.

An optical scanning device of this type is known from U.S. Pat. No. 6,067,283. This patent describes such an optical scanning device which is compatible for reproducing CDs and DVDs. When comparing the construction of the CD and DVD, it appears that the distance between the outer surface of the DVD and the surface in which the information has been recorded, and which distance is formed by the thickness of a transparent layer, is 0.6 mm. In the CD, the same distance is equal to the thickness of a transparent layer of 1.2 mm. When using an optical scanning device in which radiation is converged to a focus at the area of the layer in which the information has been recorded, the larger thickness of the transparent layer in CDs will lead to aberration of the wavefront if the optical scanning device is adapted to scan DVDs. In the U.S. Pat. No. 6,067,283, the aberration which is produced is not further discussed. The patent neither describes how the aberration is eliminated other than by means of a hologram on the separate optical element. It will be apparent from the following paragraph that the description given in this patent leaves those skilled in the art uncertain about the exact solution of the problem described.

In the case, described in said US patent, of using a diffractive structure on a separate plate, i.e. a structure not arranged on the or a lens of the objective system itself, there are two ways known to those skilled in the art for the phase correction related to the aberration. The initial situation is that the optical scanning device is adapted without further correction to scan DVDs and that correction is required to scan CDs. The reverse situation, an optical scanning device adapted to scan CDs without further corrections and corrections required for DVDs will be obvious to those skilled in the art after reading the following paragraph and will not be further discussed.

First, the diffractive structure may be such that the phase correction for CDs follows a second power function modulo $2\pi$, which means that the diffractive structure has a period which becomes quadratically smaller with an increase of the radial distance from a center. Consequently, a less converging and more diverging beam is formed so that the source is no longer seemingly infinitely far away for the objective system itself but is seemingly at a finite distance. As a result, there will be spherical aberration in the objective system. By a correct choice of the variation of the period of the diffractive structure with the distance to the center of this structure, such a conjugated distance for the objective system is determined that the spherical aberration which results from the larger thickness of the transparent layer is compensated in CDs by the spherical aberration which is produced in the objective system as a result of the finiteness of the conjugated system.

Secondly, the diffractive structure may be such that the phase correction for CDs follows a fourth power function modulo $2\pi$. In this way, spherical aberration is formed in and by the diffractive structure itself, while the vergence of the beam is not changed and the spherical aberration introduced in the radiation beam and formed in the diffractive structure is sufficient and of opposite sign to compensate the spherical aberration resulting from the larger thickness of the transparent layer on CDs.

The known solutions described above, i.e. either introducing a vergence change or changing the aberration state of the radiation beam without a change of vergence have the following drawbacks.

If the diffractive structure is such that the phase correction follows a second power function modulo $2\pi$, the positioning in the radial direction of the diffractive structure is not very critical. However, due to the change of vergence of the radiation beam between the diffractive structure and the objective system, the Abbe sine condition is no longer satisfied. As a result, a large extent of aberrations in the form of coma is produced outside the axis of the objective system.

On the other hand, a diffractive structure which is such that the phase correction follows a fourth power function modulo $2\pi$ complies with the sine condition due to the combination of the diffractive structure and the lens, and the extent of aberrations in the form of coma outside the axis of the objective system is limited. However, in this case, the tolerances for lateral, i.e. radial displacement of the diffractive structure and the objective system with respect to each other are extremely critical.

In addition to said diffractive structure for providing phase corrections, non-diffractive structures for providing phase corrections are known. An example has been described in European patent application EP 0 865 037 A1. This application relates to structures having stepped, non-periodical annular zones. It also holds for these structures that a structure which is such that a phase correction follows a second power function modulo $2\pi$ leads to a large extent of aberrations in the form of coma outside the axis of the objective system.

It also holds that such a non-periodical structure which is such that a phase correction follows a fourth power function modulo $2\pi$ leads to extremely critical tolerances for lateral, i.e. radial displacement of the structure and the objective system with respect to each other.

It is an object of the invention to provide an optical scanning device which is both not very critical with respect to the lateral, i.e. radial positioning of the structure and the objective system with respect to each other and as regards the extent of coma outside the axis of the objective system.

According to the invention, this object is achieved in that the aberration introduced by the separate, structured optical element for the second wavelength comprises both a vergence change and a spherical aberration.

It is thereby achieved that the sensitivity of the radial positioning of the structured optical element is surprisingly considerably less than when the structure produces a phase correction with only a fourth power function modulo $2\pi$. On the other hand, it has also been surprisingly found that the quantity of coma outside the axis is considerably less than the quantity of coma resulting from a diffractive structure which generates a phase correction with a second power function modulo $2\pi$. It is thereby achieved that, due to the difference of thickness of the transparent layer in CDs and DVDs (i.e. after compensation by the aberration resulting from the vergence change) is partly eliminated by aberration which is generated in the objective system as a result of the fact that the structured optical element produces a vergence change of the through-going beam and the other, remaining, part is eliminated because the spherical aberration introduced by the structured optical element corresponds to and is opposite to the remaining aberration introduced by the difference of thickness.

A preferred embodiment of an optical scanning device according to the invention is characterized in that a phase function of the aberration introduced by the separate structured optical element for the second wavelength can be written as a function of the normalized pupil ray as a polynomial having at least the two terms $a2*\rho\uparrow2$ and $a4*\rho\uparrow4$.

A diffractive surface is known from international patent application WO 99/57720 which is described by a polynomial phase function of the form phase=$c_2 r5+c_4 r/4$. Here, $c_2$ forms a diffractive strength term which controls a correction for chromatic aberration and $c_4$ is an aspherical strength term which controls correction for spherical aberration. The numerical values given in said international patent application have been given without units. It is therefore impossible to understand the meaning of the values given for the coefficients $c_2$ and $c_4$. Furthermore, the diffractive structure in said international application is provided on an entrance face of an element of the objective system. Such a provision may be effected accurately in such a way that the problem for which the present invention provides a solution, namely the extremely critical tolerances for lateral positioning of a separate, structured optical element which is not arranged on a lens, does not occur at all.

It is thereby achieved that the structure to be provided on the structured element produces both a vergence change and spherical aberration in the beam passing through the structured optical element in an extremely simple way.

A further preferred embodiment of an optical scanning device according to the invention is characterized in that a20 and a40 are the values of a2 and a4, respectively, which are required to correct the total spherical aberration in the case where a4=0 and a2=0, respectively, and that a2 and a4 are defined by the relation $0.9<((a2/a20)+(a4/a40))<1.1$.

A certain balance is thereby reached between the extent of spherical aberration which is introduced by the objective system as a result of the vergence change of the beam and the extent of aberration which is introduced in the beam by the structured optical element itself.

Another preferred embodiment of an optical scanning device according to the invention is characterized in that a2 and a20 are defined either by the relation $0.20<(a2/a20)<0.9$ in the case where a4<0 or by the relation $1.05<(a2/a20)<2.00$ in the case where a4>0.

An even greater extent of balance has thereby been reached between the extent of aberration introduced by the objective system as a result of the vergence change introduced by the structured optical element and the extent of aberration introduced by the structured optical element itself.

It is thereby achieved that, dependent on the requirements imposed on the specific optical scanning device, phase corrections can be provided which follow specific combinations of second and fourth power functions. Such phase corrections lead to a considerable tolerance in the lateral positioning of the structured optical element as well as to a small extent of aberrations in the form of coma.

These and other aspects of the invention are apparent from and will be elucidated with reference to the embodiments described hereinafter.

In the drawings:

FIG. 5 shows a Table with four different embodiments, stating the extent of coma for each embodiment as a result of the displacement and as a result of the field;

FIG. 6 shows a Table which is similar to FIG. 5 for two structures which do not comply with the requirements of the invention.

Figure 1A:
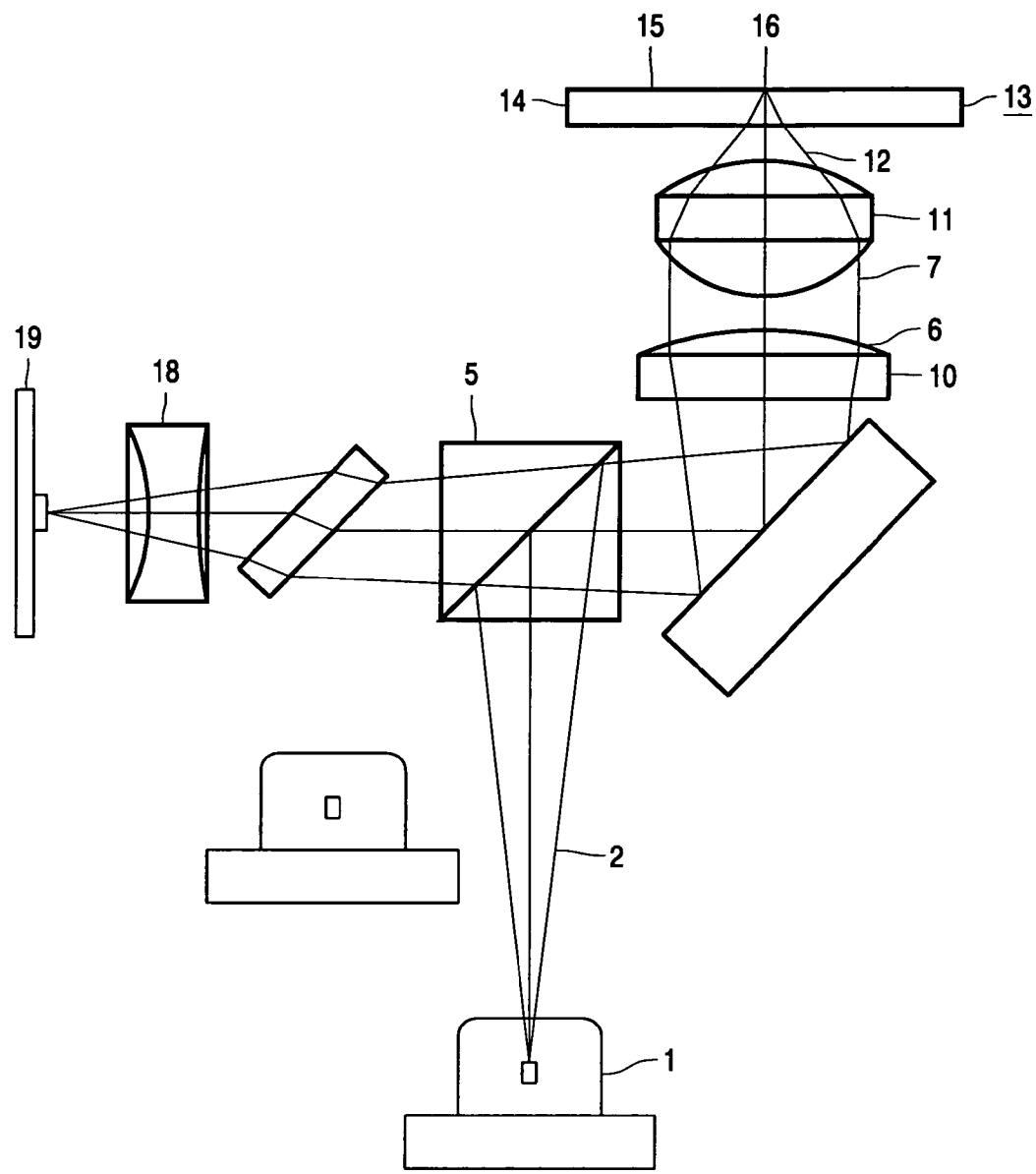
FIGS. 1A and 1B show a scanning device according to the invention.

FIG. 1A shows an embodiment of the optical scanning device according to the invention. The device has an optical path for reading and writing information on a first type of record carrier having a short wavelength and an optical path for reading a second type of record carrier having a long wavelength. The optical path comprises a radiation source 1, for example, a semiconductor laser which emits a linearly polarized divergent radiation beam 2 having a first wavelength of, for example, 650 nm. The beam passes through a polarizing beam splitter 5 which has a high transmission for the radiation beam. A collimator lens 6 converges radiation beam 2 to a collimated beam 7. A plate 10 having a structure according to the invention is fully transparent to the beam 2. An objective lens 11 changes the collimated beam 7 to a converging beam 12 for scanning a record carrier 13. The record carrier 13 is of a first type having a high density and comprises a transparent layer 14 having a thickness of, for example, 0.6 mm and an information layer 15 on which the converging beam 12 is formed to a focus 16. The radiation reflected by information layer 15 returns along the optical path of beams 12 and 7. The reflected beam is converged by collimator lens 6 and passed by polarizing beam splitter 5. A negative lens 18 in the optical path facilitates the adjustment of the position of focus 16. The reflected beam is incident on a detector system 19 which supplies an information signal as an output signal and represents the information stored in information layer 15.

Figure 1B:
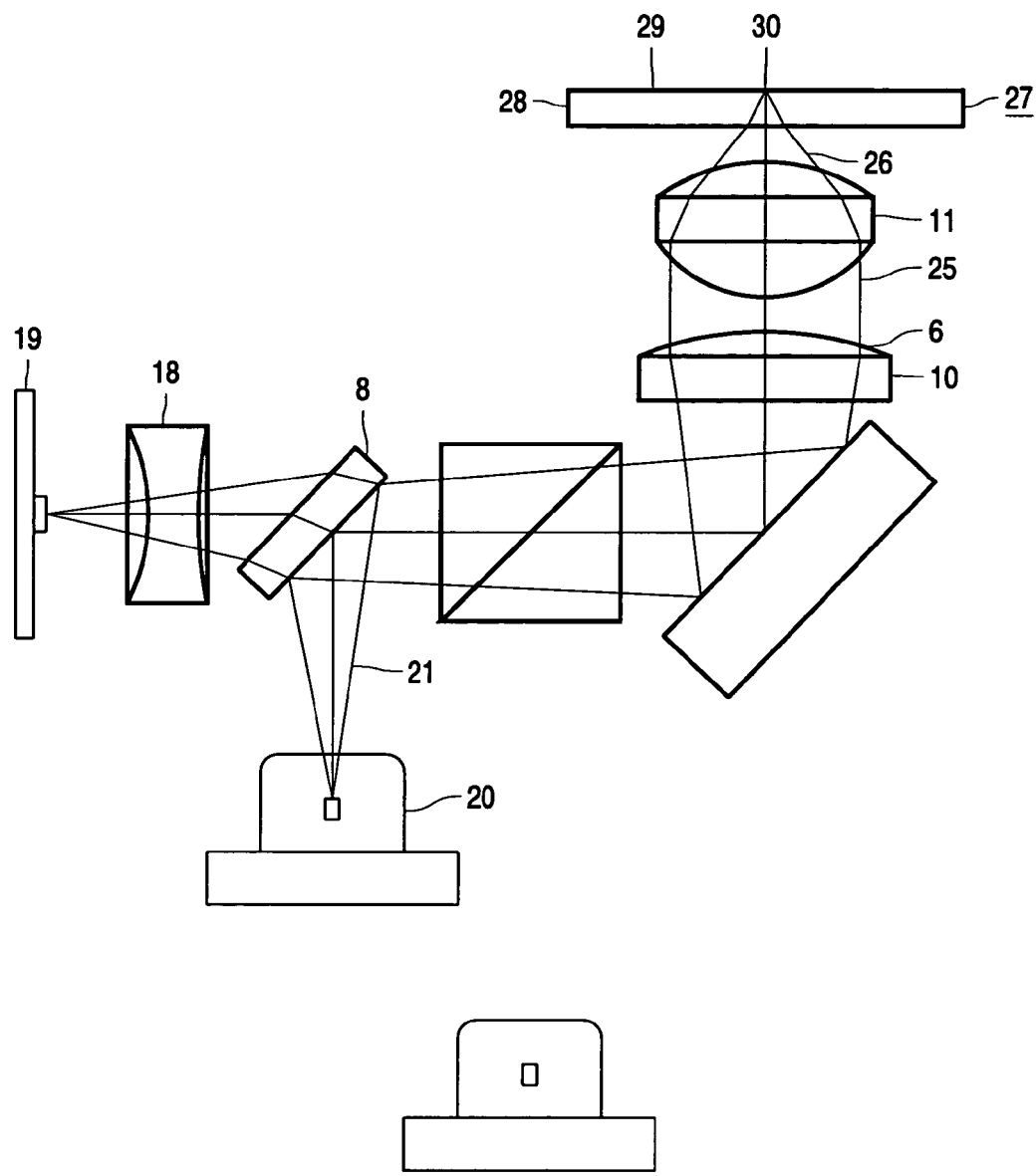

The optical path of the second mode used for scanning the second type of record carrier is shown in FIG. 1B and comprises a radiation source 20, for example, a semiconductor laser which emits a linearly polarized diverging radiation beam 21 having a second wavelength of, for example, 780 nanometers. Radiation beam 21 is reflected by a dichroic beam splitter 8. Collimator lens 6 converges radiation beam 21 to a collimated beam 25. The plate 10 with the structure adds vergence and spherical aberration to beam 21. Objective lens 11 changes the collimated beam 25 into a converging beam 26. Generally, beam 26 has a smaller numerical aperture than beam 12. The converging beam 26 is suitable for scanning a record carrier 27 of the second type. The record carrier 27 has a transparent layer 28 with a thickness of, for example, 1.2 mm and an information layer 29. The converging beam 26 comes to a focus 30 on information layer 29. Radiation reflected by information layer 29 returns along the path of the beams 26 and 21 and is passed by dichroic beam splitter 8 to the negative lens 18 and the detector system 19.

The objective lens 11 is designed to converge in the first mode the collimated beam 7 of the first wavelength through a transparent layer 14 so as to form a focus 16 on information layer 15. The spherical aberration sustained by the converging beam 12 when passing through transparent layer 14 is compensated in objective lens 11. The objective lens complies with the Abbe sine conditions. If transparent layer 14 is not present in a specific embodiment of the record carrier, the objective lens 11 should not be compensated for spherical aberration. In the second mode, the radiation beam passes through transparent layer 28 with a thickness which differs from that of the transparent layer 14. As a result, the beam 26 undergoes a different extent of spherical aberration and this extent of spherical aberration is therefore not compensated by the objective lens 11.

The diffractive structure 10 is chosen to be such that it does not have any effect on the beam 21. A way in which this can be realized has been described in European patent application EP 00203998.0 in the name of the applicant. This application also shows in which way the structure 10 may be a diffractive structure which can work as a blazed grating for the beam 7. Moreover, European patent application EP 00203066.6 in the name of the applicant describes the criteria with which a lens having such a structure must comply. The article by Jorrit E. de Vries and Benno W. Hendriks "Non-periodic phase structures in optical disc systems", Proceedings of Optical Data Storage, Sante Fe (2001) further describes in which way the structure 10 can be formed with stepped, non-periodic annular zones. As described in this article, such non-periodic structures cannot be indicated as diffractive structures as such. Nevertheless, for the sake of simplicity of linguistic usage in the description and claims, the term "diffractive structure" is understood to be both diffractive structures in their conventional meaning and non-periodic zone structures. Such a structure is herein also indicated by the term of diffractive structure.

The diffractive structure 10 produces a phase correction in the beam 7 which forms a linear combination of a second-power function and a fourth-power function. A compromise is thereby found between the poor performance outside the axis of a structure which only introduces the vergence in the beam 7 and the very critical lateral positioning of a structure which introduces a phase correction described by a fourth power function in the beam 7.

The phase correction which is introduced by the diffractive structure 10 can be generally described by the function $\Phi(\rho) = a2*\rho5 + a4*\rho^4 + O(\rho^{2n}; n \geq 3)$ wherein $\rho$ is the normalized pupil ray, i.e. $\rho=1$ at the edge of the aperture stop. Note that, when choosing a different type of pupil co-ordinate, the coefficients a2 and a4 change accordingly. The higher-order term $O(\rho^{2n}; n \geq 3)$ indicates that $\Phi(\rho)$ in any case comprises a second-power and a fourth-power term.

The maximal lateral displacement from the center of the diffractive structure 10 to the center of objective 11 will be indicated as $\Delta$. The maximum field angle of the diffractive structure 10 will be indicated as $\gamma$, a20 indicates the value of a2 which is necessary for correcting the total spherical aberration at a4=0 (i.e. only a second power term in $\Phi(\rho)$). Likewise, a40 indicates the value of a4 which is necessary for correcting the total spherical aberration at a2=0 (only a fourth-power term in $\Phi(\rho)$). If a2=0, the system as shown in FIG. 1B is very sensitive to lateral displacements of the structure 10 and if a4=0, the system shown in FIG. 1B is tolerant for lateral position shifts of the structure 10 but is beset with a considerable extent of aberrations in the form of coma outside the axis of the optical system shown in FIG. 1B.

To obtain a system which is both tolerant to lateral displacements of the structure 10 and to the field, i.e. the presence of an angle between the direction of the axis of the structure 10 and the axis of the optical device shown in FIG. 1, optimal values of a2 and a4 can be found for lateral displacements $\Delta$ (both for large and small displacements). With these values of a2 and a4, the structure 10 can be subsequently manufactured in known manner.

Small displacements $\Delta$ mean that $(f/75) < \Delta < f^*((\gamma/18°) + 1/110))$, hereinafter also indicated as condition 1, in which f is the focal distance of the objective system 11 and $\Delta$ and f are expressed in the same quantity, for example, millimeters and $\gamma$ is expressed in degrees. For such small displacements $\Delta$, the optimal value of a4 becomes negative. The sign of a4 is determined by the sign convention used for wavefront aberrations. In the relevant description, the sign convention has been laid down by determining that, when the image plane of the lens is moved, the wave front aberration (in that case the focus) is positive. This condition is independent of the numerical aperture of the objective system 11 and of the wavelength. For small displacements $\Delta$ as defined above, a good compromise is found between aberrations outside the axis and aberrations as a result of a lateral displacement if a2 and a4 satisfy $0.20 < ((a2/a20) < 0.9$ (condition 2), a4<0 and $0.9 < ((a2/a20) + (a4/a40)) < 1.1$ (condition 3).

If larger lateral displacements $\Delta$ can be expected, the aberrations as a result of the displacement become so large that they should be reduced at the expense of the performance with respect to the field. As a result, an optimum can be found for a4>0 in such situations. Such $\Delta$ are given in the range: $\Delta > f^*((\gamma/18) + 1/110))$ (condition 4). In such a situation an optimal compromise is found between aberrations in the field and aberrations as a result of lateral displacements if $1.05 < (a2/a20) < 2.00$ (condition 5), a4>0 and in which also $0.9 < ((a2/a20) + (a4/a40)) < 1.1$.

Figure 2A:
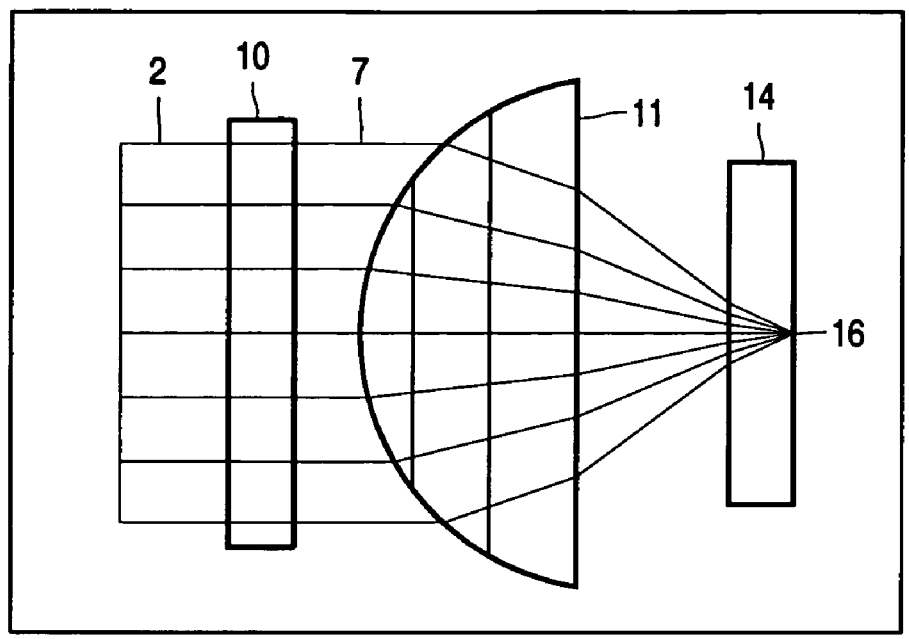
FIG. 2A is a cross-section through a plate with a structure, an objective system and a transparent layer on a DVD.
Figure 2B:
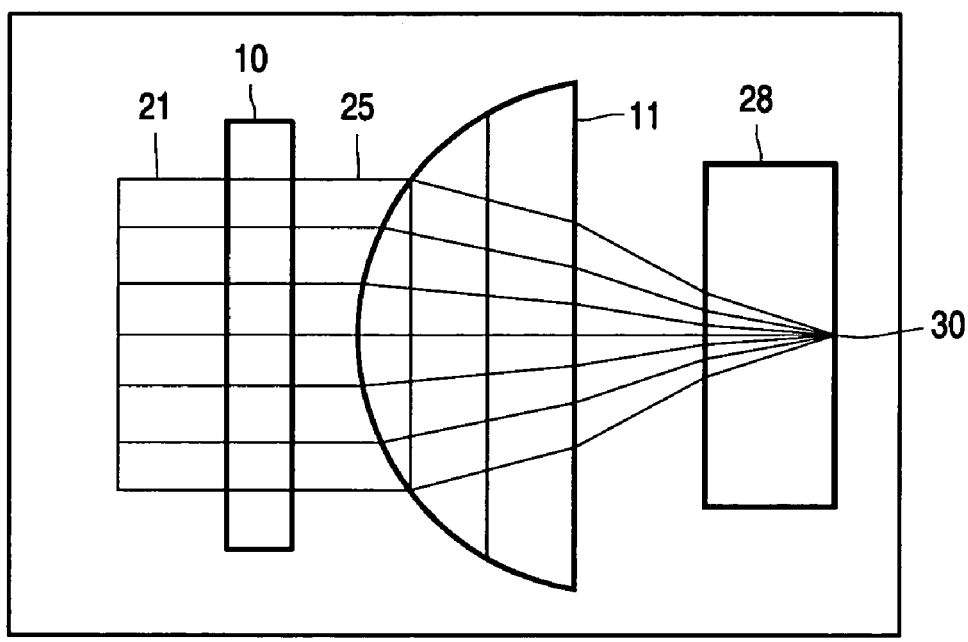
FIG. 2B is a cross-section through a plate with a structure, an objective system and a transparent layer on a CD.

FIGS. 2A and 2B show a structure 10, an objective system 11 and a transparent layer 14 on a first type of record carrier, and a transparent layer 28 on a second type of record carrier. The situation shown in FIG. 2A relates to, for example, DVD and a situation shown in FIG. 2B relates to for example CD. In FIG. 2A, the beam 2 passes unhindered through the structure 10, while in FIG. 2B the beam 21, after passing through the structure 10, has a small but sufficient extent of divergence as compared with beam 7 so as to generate an extent of spherical aberration in the objective lens 11, which largely compensates the spherical aberration as a result of the thicker transparent layer 28. However, the extent of divergence of the beam 25 in FIG. 2B is not sufficiently large to fully compensate the spherical aberration caused by the transparent layer 28 by means of the spherical aberration caused by the divergence produced in the objective system 11. Complete compensation would lead to a large extent of coma in the area around the focus 30. FIGS. 2A and 2B relate to embodiment 1 which is further specified in Table 1 in FIG. 5. Embodiments 1 to 4 shown in the Table in FIG. 5 will now be discussed separately.

Figure 3A:
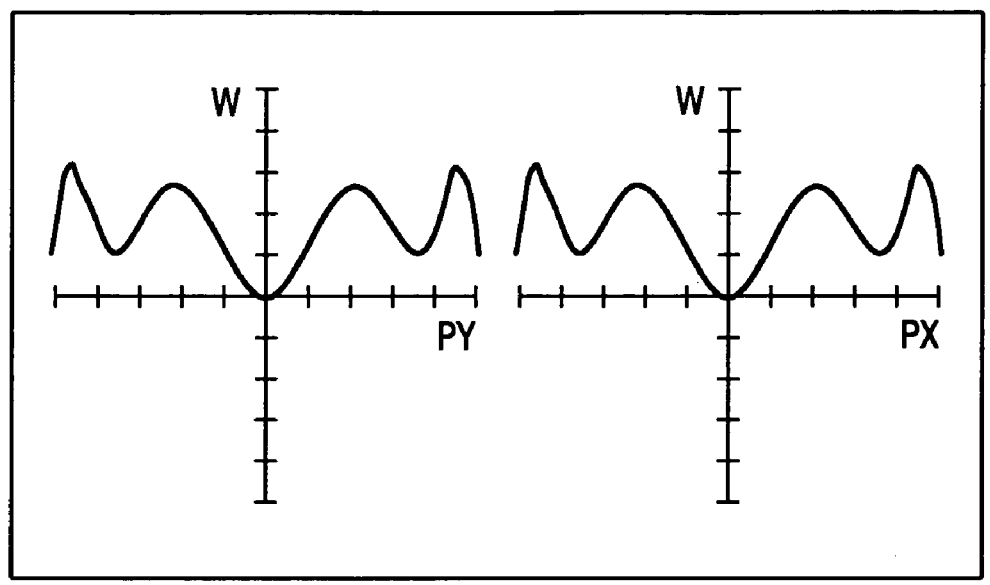
FIG. 3A shows the optical path length difference for a DVD.
Figure 3B:
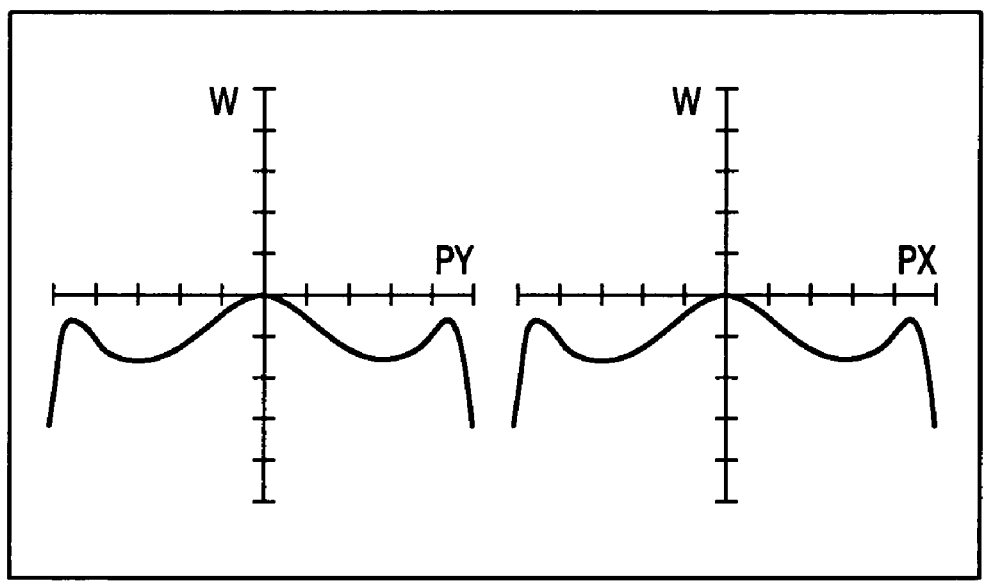
FIG. 3B shows the optical path length difference for a CD.
Figure 4A:
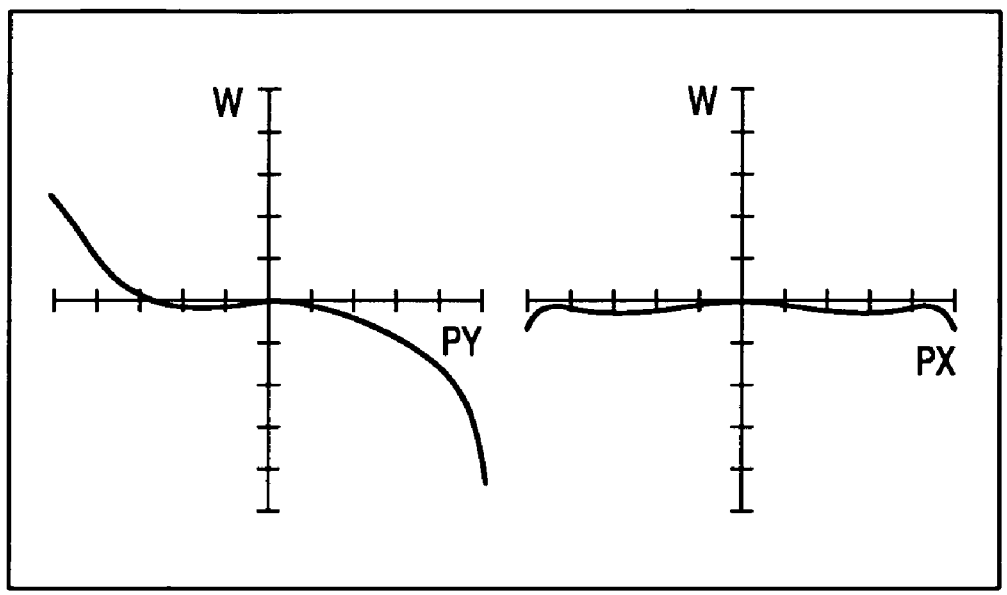
FIG. 4A shows the optical path length difference for a CD with 0.05 mm lateral displacement of a plate having a diffractive structure with respect to the objective system.
Figure 4B:
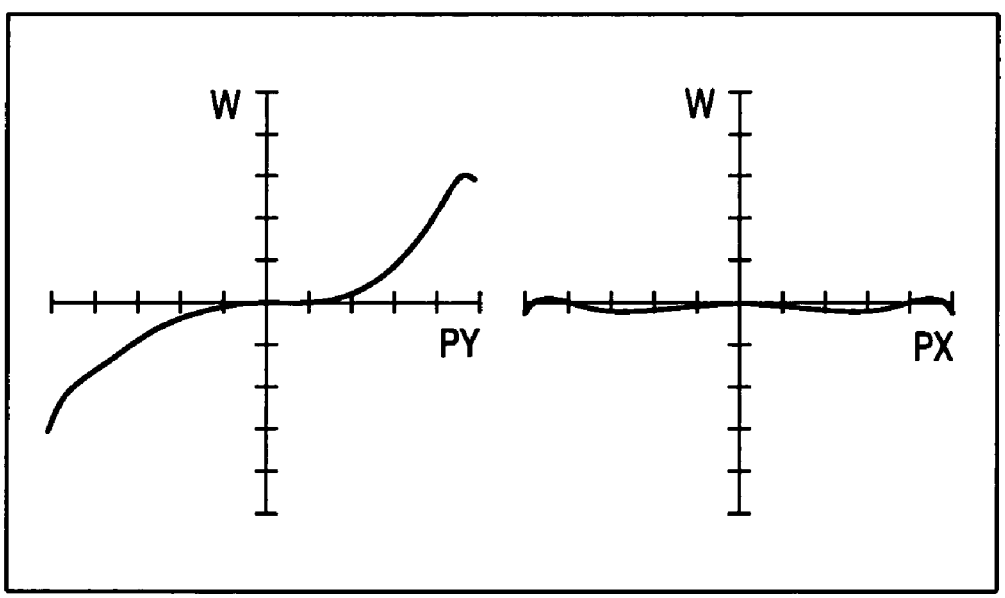
FIG. 4B shows the optical path length difference for the case of a CD with a 0.5° field.

For embodiment 1, $\Delta$ complies with condition 1, a4<0 and the value of a2/a20 is 0.50 and thereby satisfies condition 2. The coma resulting from the displacement $\Delta$ and the field $\gamma$ are approximately equal. FIG. 3 shows that a good quality of the light spot in the focus is achieved with a structure 10 as shown in embodiment 1. FIGS. 4A and 4B also show that the aberrations are approximately equal both for the displacement $\Delta=0.5$ mm and for the field $\gamma=0.50$.

For embodiment 2, Δ is larger than for embodiment 1 and the coefficient a2 will be larger than for embodiment 1. Condition 1 has been satisfied, a2/a20=0.89 so that also condition 2 is satisfied. Due to the larger Δ, both coma resulting from the displacement and coma resulting from the field are larger than in embodiment 1 so as to have the best compromise between the negative consequences of displacement and the negative consequences of field.

For embodiment 3, an objective lens with f=1.8 mm is chosen. For this lens with γ=0.50, the maximum value of Δ guaranteeing that a4<0 should not be larger than 0.06 mm in accordance with condition 1. In this embodiment, Δ=0.05 mm so that condition 1 is satisfied. The optimal combination of displacement tolerance and large field yields a value a2/a20=0.70 so that condition 2 is also satisfied.

For embodiment 4, the maximal displacement Δ is so large that a positive value of a4 is obtained. Instead of complying with condition 1, condition 4 is now satisfied. Since a2/a20=1.07, condition 5 instead of condition 2 is satisfied. The coma resulting from displacement and the coma resulting from the field are considerably larger than for, for example embodiment 1. However, with the given values for a2 and a4, a good compromise is achieved between large displacement tolerances and a large field.

The Table in FIG. 6 shows examples a and b in which at least one of the previously mentioned conditions is not satisfied.

For embodiment a, the field is reduced to 0.3° but with a smaller displacement Δ. This is a situation which comes close to the upper limit of condition 1. Condition 2 is not satisfied. An optimal correction is achieved with an almost pure second-order correction and a2≈a20.

For embodiment b, Δ is very close to the upper limit given by condition 1. Condition 2 is not satisfied. For this embodiment, the coma values for both cases are significantly different.

After the foregoing, different modifications and embodiments will be evident to those skilled in the art. All of these modifications and embodiments are considered to be within the scope of the invention.

The invention claimed is:

1. An optical scanning device for scanning a first and a second type of record carrier in a first and a second mode, respectively, the device comprising a radiation-generating device for generating a radiation beam having at least a first wavelength in the first mode and at least a second wavelength in the second mode, an objective system for forming the radiation beam of the first wavelength to a focus in the first mode on the first type of record carrier and for forming the radiation beam of the second wavelength to a focus in the second mode on the second type of record carrier, and a structured optical element arranged separately with respect to the elements of the objective system in the radiation beam for introducing aberration in the radiation beam of the second wavelength, wherein the aberration introduced by the separate, structured optical element for the second wavelength comprises both a vergence change and a spherical aberration.

2. The optical scanning device as claimed in claim 1, wherein a phase function of the aberration introduced by the separate, structured optical element for the second wavelength can be written as a function of the normalized pupil ray as a polynomial having at least the two terms $a_2 * \rho^2$ and $a_4 * \rho^4$.

3. An optical scanning device for scanning a first and a second type of record carrier in a first and a second mode, respectively, the device comprising a radiation-generating device for generating a radiation beam having at least a first wavelength in the first mode and at least a second wavelength in the second mode, an objective system for forming the radiation beam of the first wavelength to a focus in the first mode on the first type of record carrier and for forming the radiation beam of the second wavelength to a focus in the second mode on the second type of record carrier, and a structured optical element arranged separately with respect to the elements of the objective system in the radiation beam for introducing aberration in the radiation beam of the second wavelength, wherein the aberration introduced by the separate, structured optical element for the second wavelength comprises both a vergence change and a spherical aberration, wherein a phase function of the aberration introduced by the separate, structured optical element for the second wavelength includes a function of the normalized pupil ray written as a polynomial having at least the two terms $a_2 * \rho^2$ and $a_4 * \rho^4$, and wherein a20 and a40 are the values of a2 and a4, respectively, which correct the total spherical aberration in the case where a4=0 and a2=0, respectively, and wherein a2 and a4 are defined by the relation 0.9<((a2/a20)=(a4/a4))<1.1.

4. The optical scanning device as claimed in claim 3, wherein a2 and a20 are defined either by the relation 0.20<(a2/a20)<0.9 in the case where a4<0 or by the relation 1.05<(a2/a20)<2.00 in the case where a4>0.

* * * * *